April 8, 1941.                M. KRAUT                2,237,563
                              FLUID MOTOR
                          Filed July 14, 1939
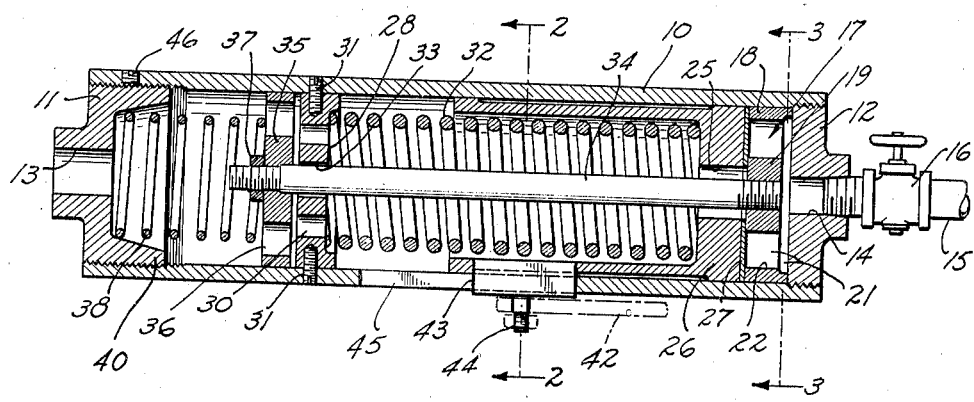
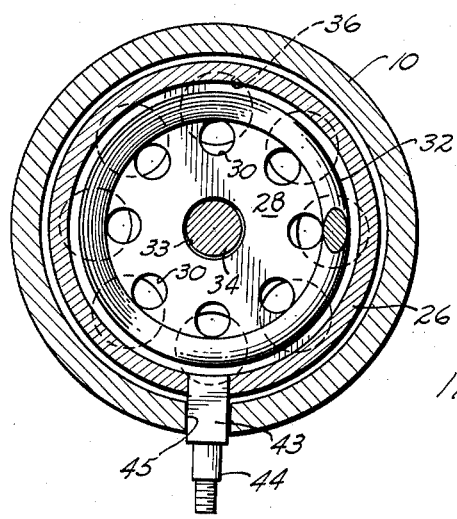 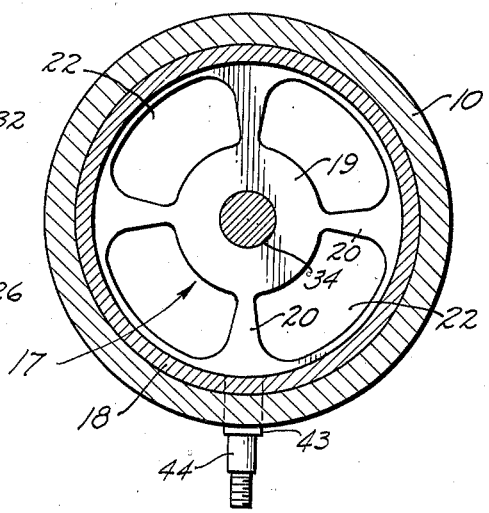
INVENTOR.
Max Kraut,
BY  Russell M. Otis
                ATTORNEY.

Patented Apr. 8, 1941

2,237,563

UNITED STATES PATENT OFFICE 2,237,563

FLUID MOTOR

Max Kraut, San Francisco, Calif.

Application July 14, 1939, Serial No. 284,514

5 Claims. (Cl. 121—123)

My invention relates to reciprocating motors adapted to be operated by fluid under pressure.

An object of my invention is to provide an efficient fluid operated reciprocating motor.

Another object is to provide a fluid motor capable of a power stroke of considerable length.

Another object is to provide a fluid motor capable of reciprocating at a very rapid rate.

Still another object of the invention is to provide a fluid motor which is rugged, is of practical construction, and is of long life.

These and other apparent objects I attain in a manner which will be clear from consideration of the following description taken in connection with the accompanying drawing, of which:

Fig. 1 is a cross-sectional view of one form of my fluid motor.

Fig. 2 is a sectional view of the motor of Fig. 1 taken on the line 2—2, as indicated.

Fig. 3 is a sectional view of the motor of Fig. 1 taken on the line 3—3, as indicated.

In the disclosed embodiment of my invention, a housing in the form of a cylinder 10 has an end 11 screwed into one threaded end and an end 12 screwed into the other threaded end thereof. The end 11 has a relatively large aperture 13 therethrough primarily for outlet of fluid, and the end 12 has a hole 14 therethrough into which a fluid inlet pipe 15 is screwed. The pipe 15 preferably has in series therewith a control valve 16. Within the cylinder 10 and abutting the end 12 at the start of operation, as in Fig. 1, is a valve element 17 comprising a ring 18 connected to a cylindrical block 19 by spaced radial webs 20. The inner portion of the ring 18, the webs 20, and the block 19 are cut back adjacent the end 12 to form part of a fluid chamber 21, the remainder of which consists in the apertures 22 between the webs 20.

Beyond the valve element 17 is a movable wall having a central hole 25 therethrough, which the block 19 is adapted to cover and close. In the disclosed embodiment the movable wall takes the form of a piston 26 adapted to fit the inside of the cylinder 10 and to slide therein. The face of the piston 26 is preferably lined with a disc 27 of compressible material such as leather. A partition 28 having a plurality of apertures 30 therethrough is retained in a fixed position in the cylinder 10 by means of screws 31. A compression spring 32 preferably abuts the partition 28 at one end and the piston 26 at the other end, forcing the piston 26 against the valve element 17. Attached to the block 19 of the valve element 17 and passing with large clearance through the hole 25, and through a hole 33 in the partition 28 is a centrally located rod 34. Attached to the outer end of the rod 34 is a guide member 35 in the form of a thick disc having apertures 36 therein and adapted to slide in the cylinder 10. The member 35 is held on the rod 34 by means of a nut 37. A spring 38 bears at one end on the end 11 and at the other end on the guide member 35, resiliently urging the valve member 17 against the end 12. The end 11 has an inwardly projecting stop portion 40 which at the start of operation, as in Fig. 1 is nearer to the guide member 35 than the end of the piston 26 is to the partition 28, thereby permitting a greater leftward movement of the piston 26 than of the valve element 17.

In the operation of the motor, fluid is admitted through the pipe 15 and inlet 14 by opening the valve 16. Fluid pressure is exerted against the valve element 17 and against the leather facing 27 of the piston 26. Both the valve element 17 and the piston 26 therefore move leftward in Fig. 1 in response to the fluid pressure until the guide member 35 engages the stop portion 40 of the end 11, whereupon the guide member 35, the rod 34 and the valve element 17 come to rest. Temporarily, however, fluid pressure continues to act upon the piston 26 to continue its leftward movement after the valve element has stopped. This continued movement of the piston opens up a passage between the apertures 22 of the valve element and the hole 25 through the piston and fluid rushes through this passage, through the hole 25, along the cylinder, through apertures 30 and 36, and out of the outlet hole 13. When fluid reaches the left side of the piston 26, pressure on both sides of the piston is substantially equalized and there is no further tendency of the piston to move leftward except that due to the momentum of the moving parts, which is quickly overcome. At the same time the fluid pressure on both sides of the valve element 17 is substantially equalized and there is no tendency due to fluid pressure for the valve element 17 to remain in its leftmost position. Furthermore, the rapid exhaust of fluid from the chamber 21 causes the pressure therein to instantaneously drop. These conditions result in the rapid return of the valve element 17 and the piston 26, by action of the springs 38 and 32, to the positions shown in Fig. 1. When the piston 26 again seals the hole 25 from connection with the apertures 22, fluid pressure immediately builds up in the chamber 21 and the piston 26 and the valve element 17 move leftward to start another cycle.

The motion of either the piston 26 or the rod 34 may be employed to reciprocate any member or device to be reciprocated. Connection may be made to either end of the rod 34, with appropriate modification of the corresponding one of the ends 11 and 12 to accommodate the member attaching to the rod 34, as will be obvious. In the disclosed embodiment, however, connection of a member 42 to be reciprocated is made with the piston 26 through a rectangular radial projection 43 carried by the piston 26. A stud 44 is shown attached to the projection 43, and to which the member 42 connects. A slot 45 provided through the wall of the cylinder 10 accommodates the projection 43 and permits its motion over the full stroke of the piston. If a rightwardly directed force (Fig. 1) is always exerted on the member 42 the spring 32 may be dispensed with, as this force may be depended upon to return the piston to the position shown. Also if motion of the rod 34 is employed to move the member to be reciprocated, and there is always a rightwardly directed force exerted on the rod 34 the spring 38 may be dispensed with and this force depended upon to return the valve element 17 to the position shown. If, however, leftwardly directed forces are exerted on the member 42 or on the rod 34 the spring 32 or the spring 38, respectively, will have to be made greater by the amount of this force.

My motor is adapted to be operated by use of either liquid or gas. It is found that the motor is capable of very rapid reciprocation, the speed of which may be varied by control of the opening of valve 16. It is also found that my motor is capable of a stroke of considerable length and that over this stroke a considerable force can be exerted by it. The stroke length may be adjusted by varying the position of the end 11. Moving the end 11 toward the left in Fig. 1 lengthens the stroke. The end 11 is retained in the fixed position selected by means of a set screw 46.

It will be understood that various changes and modifications in design and construction may be made by those skilled in the art without departing from the spirit and scope of the invention defined in the appended claims.

I claim as my invention:

1. A reciprocating fluid motor comprising: a movable wall adapted to be acted upon by fluid under pressure to move said wall, said wall having a fluid passage therethrough; a spring resisting movement of said wall by said fluid; a valve element adapted to close said fluid passage and to be urged toward closed position by action of fluid pressure thereon; means including a rod attached to said valve element and extending through said fluid passage and a guide member attached to said rod; an adjustable stop adapted to be engaged by said means at a predetermined point in its travel in such manner that continued motion of said movable wall opens said fluid passage; and a spring acting on said means independently of said piston and resisting movement of said valve element by said fluid throughout the entire stroke thereof.

2. A reciprocating fluid motor comprising: a cylinder providing a fluid chamber within having an inlet for fluid; a piston in said cylinder, the face of said piston forming a wall of said chamber, said piston having a fluid passage therethrough; a valve element urged by fluid pressure into engagement with the face of said piston to close said fluid passage; an apertured partition on the opposite side of said piston from said chamber; a compression spring disposed between said partition and said piston; a rod attached to said valve element and extending through said piston and said partition; an apertured guide member attached to said rod and slideable in said cylinder; a stop engageable by said guide member; a compression spring disposed between said stop and said guide member; and walls forming a fluid outlet from said cylinder on the opposite side of said piston from said fluid chamber.

3. A reciprocating fluid motor comprising: a housing providing a fluid chamber within; a movable wall forming one of the walls of said fluid chamber and adapted to be acted upon by fluid under pressure to move said wall, said wall having a fluid passage therethrough; a valve element adapted to close said fluid passage and to be urged toward closed position by action of fluid pressure thereon; means connected to said valve element and extending through said passage; a stop adapted to be engaged by said means at a predetermined point in its travel in such manner that continued motion of said movable wall opens said fluid passage; means for returning said movable wall; and a spring abutting a stationary wall of said housing and acting upon said means throughout the entire stroke of said valve element to resist movement thereof by said fluid under pressure.

4. A reciprocating fluid motor comprising: a housing providing a fluid chamber within; a movable wall forming one of the walls of said fluid chamber and adapted to be acted upon by fluid under pressure to move said wall, said wall having a fluid passage therethrough; a valve adapted to close said fluid passage and to be urged toward closed position by action of fluid pressure thereon; means attached to said valve and including guide elements on both sides of said movable wall in sliding contact with said housing; a stop adapted to be engaged by said means at a predetermined point in its travel in such manner that continued motion of said movable wall opens said fluid passage; and means for returning said movable wall and said valve.

5. A reciprocating fluid motor comprising: a cylinder having a stationary end wall with a fluid inlet passage therethrough; a piston movable in said cylinder and having a face opposite said stationary wall, said piston having a fluid passage therethrough; a valve element slideable in said cylinder and located between said piston and said stationary wall and adapted to abut said stationary wall, said valve element being adapted to be urged by fluid pressure against the face of said piston to close the fluid passage through said piston, and being recessed adjacent said fluid inlet passage and apertured to permit access of fluid to the face of said piston; means urging said valve element toward said stationary wall; means urging said piston toward said valve element; means connected to said valve element extending through said fluid passage through said piston; and stop means engageable by said last-mentioned means to stop said valve element at a certain point in its travel, while permitting said piston to continue in motion.

MAX KRAUT.